United States Patent [19]

Simms

[11] Patent Number: 4,697,374

[45] Date of Patent: Oct. 6, 1987

[54] BIOLUMINESCENT SIMULATOR AND METHOD

[76] Inventor: Robert A. Simms, 3334 N. 60th St., Scottsdale, Ariz. 85018

[21] Appl. No.: 915,551

[22] Filed: Oct. 6, 1986

Related U.S. Application Data

[63] Continuation of Ser. No. 694,807, Jan. 25, 1985, Continuation-in-part of Ser. No. 536,542, Sep. 28, 1983, abandoned.

[51] Int. Cl.$^4$ ............................................. A01K 85/01
[52] U.S. Cl. .................................... 43/17.5; 43/17.1
[58] Field of Search ...................... 43/17.1, 17.5, 17.6

[56] References Cited

U.S. PATENT DOCUMENTS 4,227,331  10/1980  Ursrey .................................. 43/17.6

Primary Examiner—Kurt Rowan
Attorney, Agent, or Firm—LaValle D. Ptak

[57] ABSTRACT

A bioluminescent simulator for use as an underwater attractant for aquatic creatures, such as fish and crab, is in the form of a power supply, monostable multivibrator, and a green light-emitting diode, all potted in a clear acrylic epoxy potting material with an on/off power supply switch constituting a pair of spaced-apart conductive lugs extending out of the potted housing. The housing is waterproof and the lugs permit power to be supplied from the power supply to the light source when a conductive switching bar is slipped over the lugs and tightened them. The switching bar has on tie-on rings on the opposite ends to permit the simulator to be tied to a fishing line, crab pot, or the like.

3 Claims, 6 Drawing Figures

U.S. Patent   Oct. 6, 1987   Sheet 1 of 2   4,697,374
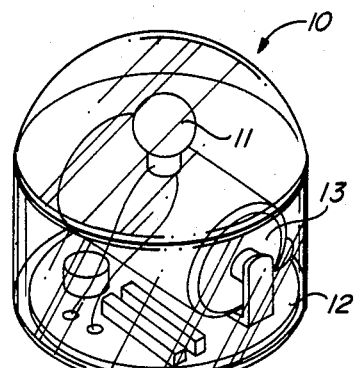
Fig. 1
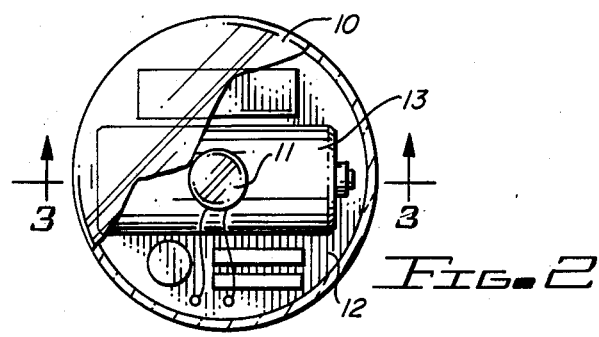
Fig. 2
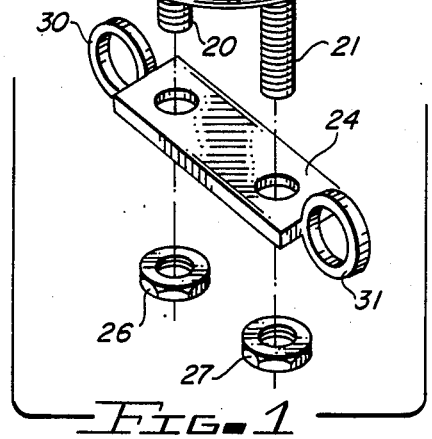
Fig. 3
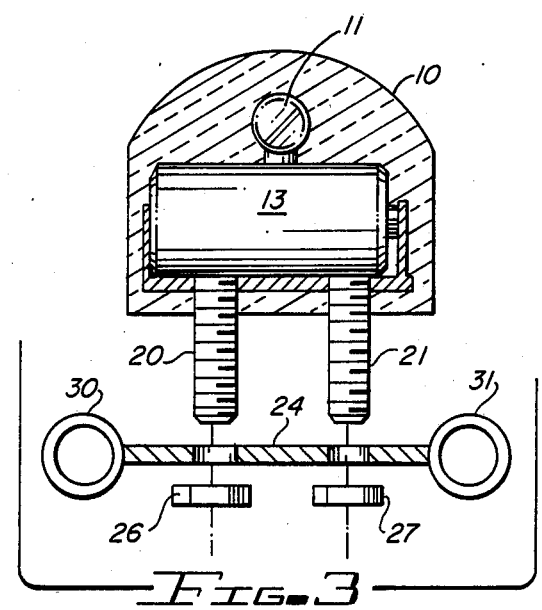
Fig. 4
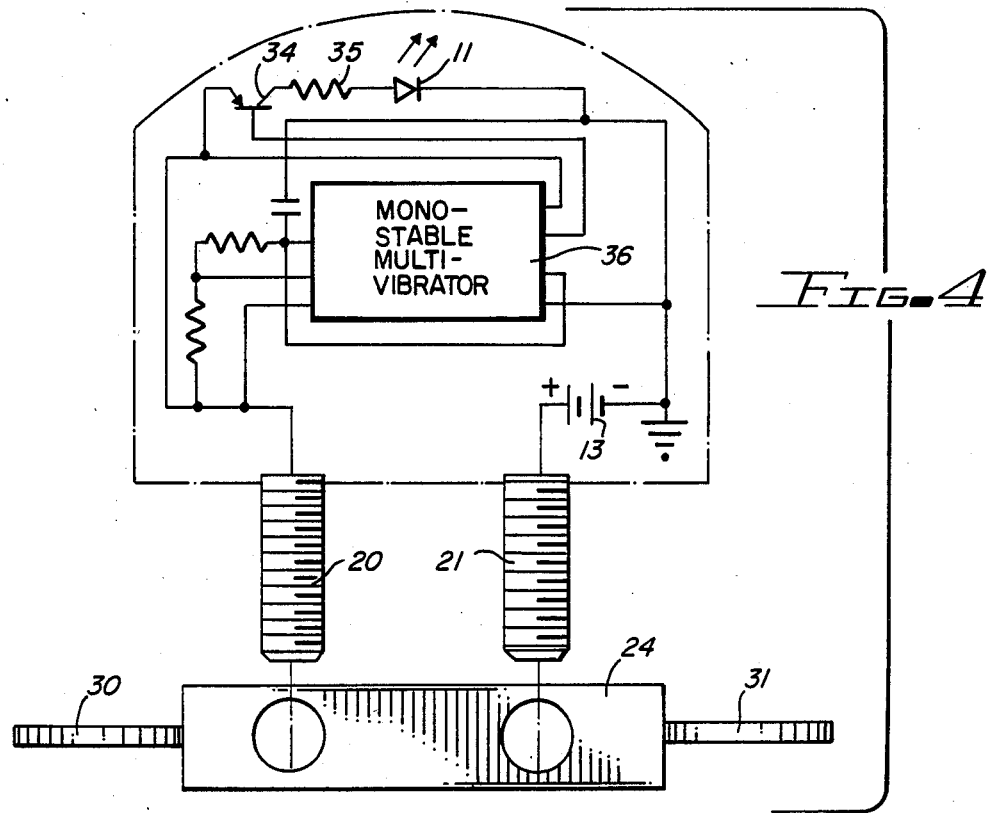

BIOLUMINESCENT SIMULATOR AND METHOD

RELATED APPLICATION

This application is a continuation of application Ser. No. 694,807, filed 1/25/85 which in turn is a continuation-in-part of copending application Ser. No. 06/536,542, filed on Sept. 28, 1983 now abandoned.

BACKGROUND

In both commercial and sport-fishing, there is a constant challenge of locating, attracting, and catching the fish or other seafood (such as crabs and lobsters) desired by the fishermen. To accomplish the desired purpose of attracting and catching the fish, once they have been located or in an area where the fisherman reasonably expects to locate fish, various types of fish lures and baits have been developed over the years. Much sport-fishing uses live bait, particularly in fresh waters. In ocean fishing, however, artificial lures are generally used. Such lures, to be effective, must function to attract the fish in a manner which causes the fish to strike at the lure and the hook, which is either attached to or adjacent the lure.

In an effort to attract fish to lures, a variety of attempts have been utilized in the past to provide lights or illumination for such lures. These illuminated lures usually incorporate an incandescent lightbulb or a light-emitting diode, along with an appropriate power supply, providing either a steady light or a flashing light. Patents which are typical of such lures are the U.S. Pat. No. 3,940,868, to Northcutt, U.S. Pat. No. 4,227,331 to Ursrey, U.S. Pat. No. 4,085,538 to Jankowski, U.S. Pat. No. 4,114,305 to Wohlert, U.S. Pat. No. 2,897,623 to Flourny, U.S. Pat. No. 3,077,046 to Murray, U.S. Pat. No. 3,213,5652 to Salvin, U.S. Pat. No. 3,308,569 to Foellner, U.S. Pat. No. 3,721,033 to Hayes, and U.S. Pat. No. 3,969,839 to Ziegler. All of these patents incorporate a light source and power supply in conjunction with an otherwise standard fish lure. In some of the patents, the power supply is separate from the lure itself and generally is carried on the line ahead of the lure. For example, this construction is used in the lures of Northcutt and Foellner.

In most cases, the selection of the light source has been made with little or no consideration to the light transmission characteristics of the water, or is made without regard to a determination of whether light of particular color and of particular rise and decay times is more effective than light of other colors and other rise and decay times in attracting fish and other aquatic creatures. With most of these prior art devices, the underlying theory appears to be that if there is a flashing light of any wave length, fish will be attracted to it, as opposed to a lure which has no light at all.

With respect to such lures using incandescent lamps, additional disadvantages exist because of the fragility of the lamps and their relatively high power requirements. Consequently, the battery power supplies either are quite short-lived or are too bulky for practical implementation in conjunction with or as part of an underwater fishing lure.

Those lures using light-emitting diodes are not subject to the fragility/power supply shortcomings of the incandescent lamp lures. Of the above patents, Wohlert, Jankowski, Ursrey, and Northcutt recognize the advantages of light-emitting diodes and disclose a variety of different lures employing such diodes. In the Wohlert and Ursrey patents, the light-emitting diode is shown attached to a fishing lure body and either flush with the surface or extending from the body. Consequently, the light-emitting diode is visible only in a limited viewing angle since, from most directions, the lure body itself blocks the view of the light-emitting diode. When the diode protrudes from the lure body, as in Ursrey, it also is susceptible to damage through careless handling and from fish strking the lure. Such damage may result in a breaking of the diode itself or a breaking of the electrical connections to it.

The diodes used in the Northcutt and Jankowski lures, at least in some embodiments, are adjacent the hook; and, because of the manner of mounting the diode facing along the shank of the hook rearwardly of the line, a relatively wide viewing angle is provided. The viewing angle of the lure, however, is blocked from the forward direction by the power source which is attached to the diode base.

With the exception of Ursrey, none of the above light-emitting diode lure patents appear to take into consideration any particular wave length or color characteristics as being more or less desirable. Ursrey states that it has been observed that light-emitting diodes that emit green light appear to be more attractive to fish. Ursrey also states that an additional factor may be that, in bodies of water where fish are normally found, green light is not filtered out as much as perhaps other colors of light, for example, such as red light. Ursrey, however, does not disclose selection of pulse rise and decay times to relate to any particular natural marine occurrence.

As far as Applicant is aware, the lighted fishing lures typified by the patents listed above all have been developed for use with fresh water fishing. The different environment present in salt water fishing and the characteristics present in the life support feeding chain of the salt water oceans have not been considered.

An unusual phenomenon which is unique to salt water is the presence of bioluminescence. In the sea, bioluminescence is light produced by living animals and plants comprising thousands of species of marine organisms, including plankton and dinoflagellates. These photosynthetic marine protozoa have world-wide distribution and are the basis for the entire food economy of the oceans. The smaller fishes and marine creatures feed directly on the dinoflagellates or plankton. Larger fishes then feed on these smaller fishes, and so on, up through the food chain, to the largest fish. It is these larger fish which usually are desired as food for human consumption and which are the object of significant commercial fishing operations. Typical are Alaska king salmon which are caught by trolling through waters in which the salmon are present.

Most bioluminescence in the sea is caused by dinoflagellates which emit light when they are stimulated. This light is produced by a biochemical reaction resulting from the stimulation. Consequently, if the water in which such dinoflagellates, or plankton, is stirred or disturbed, luminous discharges of the individual dinoflagellates appear as pulses of tiny flashing lights having specific colors and particular rise and decay times. If significant agitation of the water occurs, the points of light emitted by the individual dinoflagellates fuse into a bright glow. Turbulence which results from the swimming motion of fish through an area of water having concentrations of dinoflagellates is one way in which this mechanical stimulation is provided.

Thus, it has been discovered that where bioluminescence caused by luminous discharges of dinoflagellates occurs, generally smaller fish feeding on the dinoflagellates are responsible for bioluminescence. Thus, in turn, appears to attract the next larger fish in the food chain, and so on, up to and including the largest, or end, fish and other aquatic creatures in the food chain. Each fish in the chain apparently associates food with the bioluminescent flashing, or glow, caused by the dinoflagellates as a result of the presence of the smallest fish in the food chain.

While bioluminescence of different colors, ranging from the red end of the visible spectrum to the blue-green end, exists, the most common colors of bioluminescence in areas where desirable food fish (for human consumption) may be found is in the blue-green, or green, portion of the light spectrum. Different colors in this range are emitted by different dinoflagellates found in different waters or regions of the world. It further has been observed that seawater significantly attenuates light at the red end of the spectrum and has minimal attenuation (or maximum transmission) for light in the green or blue-green portion of the visible spectrum. As a consequence, except for light sources of extremely bright intensity, light of wave lengths, other than the green or blue-green wave lengths, is not visible beyond a few meters, whereas light in the green or blue-green portion of the spectrum is visible a significantly greater distance from the source. This accounts for the fact that many underwater movies or underwater pictures have an overall green coloration with little or no red colors being visible.

Accordingly, it is desirable to devise a marine bioluminescent simulator (both in wave length and pulse time characteristics) for use in conjunction with fishing lures, traps, and the like for attracting desirable game fish and crustaceans, such as Alaskan king crab, to fishing lures, crab pots, or other fishing apparatus to increase the catch above that which is possible using equipment not having bioluminescent simulators.

SUMMARY OF THE INVENTION

Accordingly, it is an object of this invention to provide a marine bioluminescent simulator.

It is another object of this invention to provide a salt water bioluminescent simulator for attracting game fish and crustaceans.

It is an additional object of this invention to provide an improved, inexpensive bioluminescent simulator for use with fishing lures.

It is a more specific object of this invention to provide a marine bioluminescent simulator using a light-emitting diode, emitting pulses of light having wave lengths and rise and decay characteristics corresponding to those of natural marine bioluminescence and packaged as a self-contained unit for use with fishing lures and underwater traps.

In accordance with a preferred embodiment of this invention, a bioluminescent simulator for use as an underwater attractant includes a light-emitting diode as a light source emitting light having a wave length of marine bioluminescence in the green color portion of the visible light spectrum. This light-emitting diode is packaged along with a power supply and an interconnecting circuit in a watertight housing. The light source is intermittently energized to produce pulses of light having wave form characteristics which simulate natural bioluminescence. The housing itself is constructed to permit light from the light source to emit from it and includes an element to permit the simulator to be attached to a line.

In a more specific embodiment, the housing is made of a transparent epoxy which encases all of the components in a watertight environment and which further passes light from the light-emitting diode through the epoxy material into the water surrounding the simulator when it is in use.

BRIEF DESCRIPTION OF THE DRAWINGS

FIG. 1 is a partially exploded perspective view of a preferred embodiment of the invention;

FIG. 2 is a partially cut-away view of the top of the preferred embodiment shown in FIG. 1;

FIG. 3 is a cross-sectional partially exploded view of the embodiment shown in FIG. 1; and FIG. 4 is a circuit diagram of the embodiment shown in FIG. 1, and FIGS. 5 and 6 illustrate bioluminescent charactersitics incorporated into the operation of the embodiment of FIG. 1.

DETAILED DESCRIPTION

Figure 5:
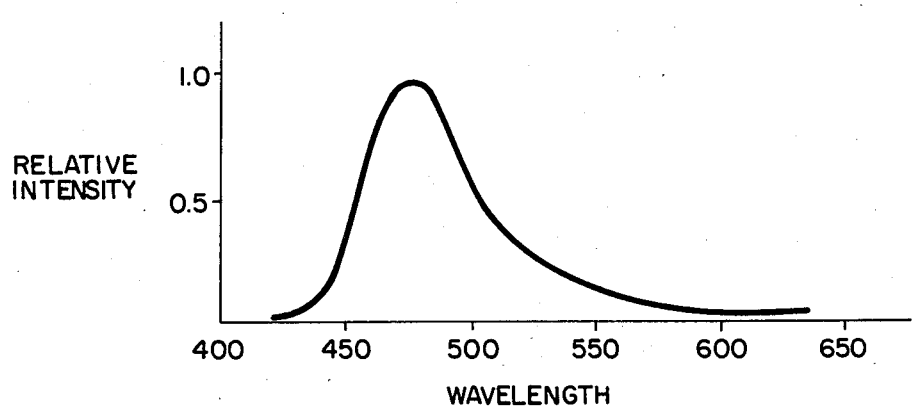

Reference now should be made to the drawing in which the same reference numbers are used in the various figures to designate the same or similar components. The bioluminescent simulator shown in FIG. 1 comprises a housing 10 made of a clear plastic casting resin capable of forming a watertight seal for the various components potted or encased within the resin. The resin itself may be cured in a form having the shape shown in FIGS. 1, 2 and 3. Once the resin hardens, it provides support and protection for the components of the bioluminescent simulator system which is encased within it.

The system itself consists of a light-emitting diode (L.E.D.) 11 which is selected to provide light at the wave lengths of typical marine bioluminescence. Typically, the L.E.D. 11 emits its maximum light intensity in the green color portion of the visible light spectrum having light of substantial intensity at wave lengths between 450 nm and 550 nm. A commercially available L.E.D., which actually has been used in a bioluminescent simulator, is an AND164UG, manufactured by the AND Corporation of Burlingame, Calif. Other commercially available L.E.D.s producing green light in this frequency range could be used as well.

Other circuit components for supplying an intermittent on/off power to pulse the L.E.D. 11 are encased in the housing 10 and are mounted on a printed circuit board 12 having a circular base configuration. This base configuration is selected to provide the generally cylindrical shape of the housing 10 which is shown in the drawings, but other configurations could be used as well. The particular shape of the device is not significant.

As illustrated in FIGS. 1, 2 and 3, a variety of other electrical components are mounted on the board 12, which also has room on it for a battery 13 used as the power supply for the L.E.D 11. The various parts are wired together in an electrical circuit which is shown in detail in FIG. 4. All of the electrical parts, wiring, printed circuit board 12, and L.E.D. 11 are potted permanently within the clear plastic epoxy housing 10.

As is readily apparent from the foregoing and from an examination of FIGS. 1, 2 and 3, the device illustrated is designed to be thrown away when the battery 13 becomes discharged or worn out. The invention, however, also is capable of implementation with a different housing in the form of a hollow, generally cylindrically-shaped device having a watertight seal which may be broken to permit removal of a worn-out battery 13 and its replacement with a fresh battery, if desired. Such a construction, however, would be more costly to implement, and; for most purposes, a throw-away assembly of the type illustrated in FIGS. 1, 2 and 3 is perferred.

To prevent discharge of the battery 13 prior to the time its operation to power the circuitry driving the L.E.D. 11 is actually desired, a pair of lugs 20 and 21 extend through the housing 10 and constitute the two terminals of an on/off switch located in a series circuit between the power supply battery 13 and the circuitry for operating or supplying power to the L.E.D. 11. When it is desired to make the device operative, a conductive metal switching bar 24 having a pair of spaced-apart holes through it is slipped over the lugs 20 and 21 and tightened in place by means of corresponding nuts 26 and 27. Once the nuts 26 and 27 are tightened onto the lugs 20 and 21, with the bar 24 first slipped over the lugs, a tight electrical and mechanical connection is made between the lugs 20 and 21. The series circuit between the battery 13 and the remainder of the electrical circuit inside the housing 10 then is completed to permit operation of the circuit to illuminate the L.E.D. 11.

The bar also carries, on its opposite ends, a pair of tie-on rings 30 and 31 which are used to attach the bioluminescent simulator 10 to a fishing line, fishing lure, leader, crab pot, or the like, placing the device in use. Typically, these tie-on rings are used to place the simulator 10 near the hook or lure to which fish or other aquatic creatures are to be attracted for the purpose of catching them.

By using a hard epoxy casting material for the housing 10, and by completely encasing the L.E.D. 11 as shown in FIGS. 1 and 3 inside the epoxy casting, protection of the L.E.D. 11 and the associated circuitry for operating it from careless handling, striking by fish, and the like, is effectively produced. At the same time, as is apparent from an examination particularly of FIGS. 1, 2 and 3, a maximum viewing angle of the L.E.D 11 is provided. This is because the entire housing is transparent. Thus, fish or other aquatic creatures approaching the simulator from practically any direction, except from directly below the device as shown in FIG. 3, will see the light emitted from the L.E.D. 11 and be attracted to it. This is a significant advantage since, in most cases, the fisherman does not know (except to a very general extent) wshere the fish to be caught is located with respect to the simulator 10 when it is underwater.

FIG. 4 is a schematic diagram of the circuit used to operate or supply power to the L.E.D. 11. This circuit includes the battery 13 as a source of power supply. As is shown in FIG. 4, the posts 20 and 21 must be bridged by the conductive bar 24 to complete a circuit from the positive terminal of the battery 13 to the remainder of the circuit shown in FIG. 4. The battery 13 supplies power through a PNP switching transistor 34 and a current-limiting resistor 35 to the L.E.D. 11. Operation of the switching transistor 34, in turn, is provided by a monostable multivibrator 36 which may be any one of a wide variety of types commercially available.

The monostable multivibrator 36 is selected to have a frequency of operation which approximates the frequency of flashing bioluminescence typically encountered when marine dinoflagellates are stimulated under natural conditions. Typically, this is in the vicinity of two or three pulses per second with an approximate 50% duty cycle of operation. As stated previously, this light is a green color, which is the natural color of most such marine bioluminescence and which also has the characteristics of the best relative transmision through seawater (as opposed to red light, which becomes invisible after a relatively short distance from the source). In addition, the multivibrator 36 produces pulses with the rise and decay characteristics selected to duplicate, as nearly as possible, the rise and decay characteristics of the particular marine bioluminescence desired for any given application.

Various scientific studies have been made to determine the characteristics of marine bioluminescence. It has been found that the various dinoflagellates vary considerably with respect to the pulse characteristic of the bioluminescence flashing and also, vary over a relatively wide range of wave lengths in the green/blue-green color range. Typical characteristics of the bioluminescence for 5 different dinoflagellates are illustrated below in the following chart:

| CHART | | | |
|---|---|---|---|
| DINOFLA-GELLATE | RISE TIME TO MAXIMUM | DECAY TIME TO ZERO | MAXIMUM INTENSITY WAVE LENGTH |
| Aequorea Forskalea | 0–0.11 Seconds | 0.45–1.35 Secs. | 508 RM |
| Pyrosoma Atlanticum | 0–0.3 Seconds | 6.9 Secs. | 493 NM |
| Chaetopterus Variopedatus | 10–14 Seconds | 30 Secs. | 475 NM |
| Mnemiopsis | 4.5–59.9 Millisec. | 230 Millisec. | 488 NM |
| T. RaschII | 0.1–0.2 Seconds | 0–12 Secs. | 480 NM |

These different dinoflagellates are found in different salt water regions. As is readily apparent from an examination of Chart 1, the characteristics which differ most greatly from one dinoflagellate to another are in the rise time and decay times of the pulses or light flashes constituting the bioluminescence. The variation in the wave length of the maximum light intensity is not quite so pronounced, although, for the five different dinoflagellates illustrated in Chart 1, this wave length varies from 475 NM to 508 NM. Thus, in order to simulate the bioluminescence of these different dinoflagellates, diodes or other suitable light sources which produce maximum light intensity in the range of 450 NM to 550 NM are to be preferred.

To simulate the different dinoflagellates which are illustrated, the characteristics of the pulsing circuit, primarily comprising the monostable multivibrator 36, need to be tailored specifically to produce the desired effects which are unique to the particular dinoflagellate being simulated.

Figure 6:
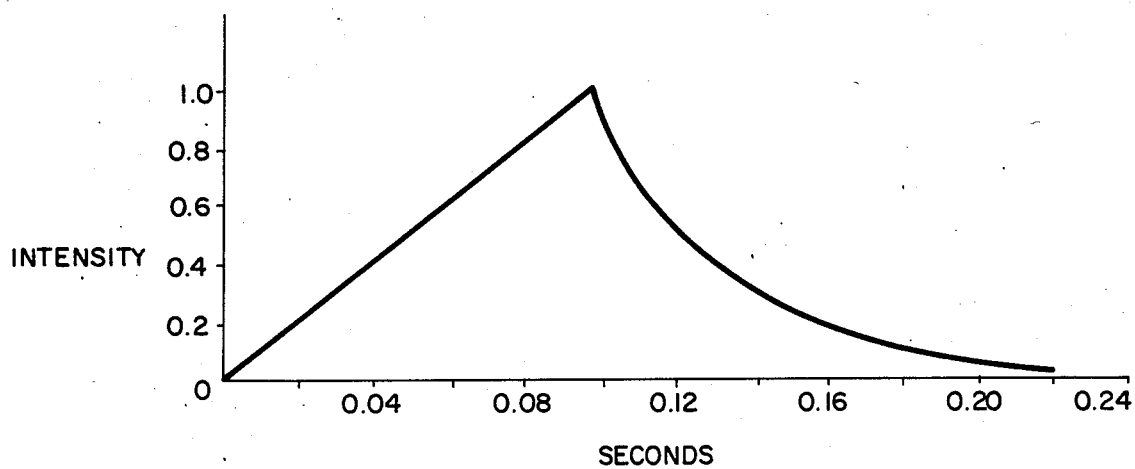

FIGS. 5 and 6 illustrate the same characteristics provided in Chart 1 for the last dinoflagellate in the list of Chart 1, namely T. Raschii. FIG. 5 shows the spectral distribution of luminescence of T. Raschii; and FIG. 6 illustrates the rise and decay times of pulses produced by this dinoflagellate from zero to a maximum relative intensity and back again to zero. It has been found that the rise time of the pulses is substantially a linear characteristic, while the decay time follows a more generally exponential curve. This is illustrated in FIG. 6

The simulation of the dinoflagellate characteristics, both of spectral distribution of luminescence and pulse wave form (as well as frequency of repetition) is important in order to take advantage of this phenomenon, as it applies to the marine food chain discussed more generally above. The predator fish (or crustacean) is attracted to its prey, either directly or indirectly by means of the bioluminescence. An example of direct attraction is afforded when the predator is attracted to the prey through the "flashing" of the marine bioluminescence directly. This occurs when tuna are attracted to the bioluminescence of plankton caused by the action of anchovies feeding on the plankton. The target of the tuna is the anchovy and not the plankton, but the tuna instinctively knows that where the bioluminescent activity takes place, anchovies are to be found.

The bioluminescence of plankton which attracts tuna, however, is quite different from the bioluminescence of dinoflagellates, such as T. Raschii found in Alaskan fishing waters and which attracts salmon, halibut, cod and rock bass found in those waters.

Consequently, it is important that the bioluminescent simulation duplicates the spectral wave length of the bioluminescence of the particular dinoflagellate or plankton found in the fishing waters being fished and further that it duplicates the pulse characteristics in terms of the rise time to the peak value of the emitted radiation and the subsequent decay time from maximum value to the zero value. Finally, the pulse repetition frequency must be simulated as nearly as possible. Thus, each bioluminescent simulator must be tailored to the given predator/prey combination which exists in conjunction with the fish or other marine creature which is to be caught. Thus, the simulator for salmon fishing is selected to have the characteristics of T. Raschii as near as possible. These characteristics are illustrated in FIGS. 5 and 6. Since tuna and shrimp are caught in different waters in different parts of the world from salmon, different characteristics of a biolescent simulator would be employed for catching tuna and the like.

A simulator, having the characteristics outlined above and made in accordance with the disclosure described and shown in FIGS. 1 through 6, has been utilized in conjunction with a salmon troller operating as a commercial salmon fishing boat. Typically, such trollers carry two main outrigger lines on each the starboard and port sides of the boat. One of these lines is on the top (extending past the stern) and one is on the bow of the boat. Each main line also typically carries four plugs or spoons, spaced at four fathoms beginning with the deepest one. Fifty foot leaders are common, and the maximum depth to the first leader typically is twenty fathoms, although this is varied somewhat with the area being fished.

To test the results of the simulator, a single simulator was located on the starbord bow line at the third plug up from the bottom (thus, at the twelve-fathom depth in this example). The line with the simulator on it was lowered at 1:30 p.m. Prior to this, no hits were recorded on any of the lines for the previous hour. At 1:30 p.m., there were three strikes on the starboard topline. At 1:45 p.m., two more strikes occurred on the port bow line. The simulator then was pulled from the water. These strikes took place during a time when normally, little or no activity is present.

The next day, after the typical early morning "bite" was over and after no strikes had taken place for an hour, the simulator was placed on the starboard bow line adjacent the third plug up from the bottom. This was done at 8:00 a.m. at 8:10 a.m., a king salmon hit the plug immediately beneath the location having the simulator on it. At 8:20, two more king salmon hit the bow line and one hit the starboard top line. At 8:30 a.m., there was a hit on the starboard bow line and the fish broke off all of the gear below the simulator. At 8:30 a.m., there was a hit on the starboard bow and one on the starboard top line (both missed catching). At 8:45 a.m., the simulator was removed from the line to test the strike pattern without it. The next hit occurred at 9:15 a.m. on the starboard bow (a king salmon). At 9:55 (with no action since 9:15 a.m.), a king salmon was caught on the starboard bow line. This is a more typical pattern of spacing between the hits on a commercial troller (approximately 45 minutes to one hour between).

On successive days, additional experiments were made with the simulator on various ones of the lines in different positions for a period of time, followed by time periods when no simulator was in the water on any of the lines. At all times, when the bioluminescent simulator was in place, the number of hits and their frequency was considerably greater than when it was not in place. This was found to be true, whether the simulator was used during normal "peak" times or during the off times when little or no activity is normally expected.

It is apparent that the simulator attracted fish to the region of the plugs being pulled through the water by the troller. Most of the activity occurred on the lines directly associated with the simulator, but considerable activity also was observed on plugs of the other lines at the same time. The conclusion drawn is that the simulator attracts the salmon to the region through which all of the plugs are moving and thereafter, the salmon spot various ones of the plugs and hit them.

The foregoing description and the illustration of the embodiment shown in the various figures of the drawings should be considered as illustrative only of the invention, and not as limiting. Various modifications of the housing, its shape, its general configuration, and arrangement of components will occur to those skilled in the art. For example the on/off switch accomplished by means of the bar 24 can be replaced by a more conventional switch, or by a water-actuated switch, if desired. Furthermore, the particular circuit which is shown for operating the L.E.D. 11 may be replaced with other circuitry to accomplish the same or similar result. Various other changes and modifications will occur to those skilled in the art without departing from the true scope of the invention.

I claim:

1. A method for simulating the light emitting characteristics of specific marine orgranisms such as dinoflagellates or plankton to attract salt water aquatic creatures including the steps of:
   providing an underwater light source for emitting light with wavelengths corresponding to the wavelengths of light of the bioluminescence of a specific marine orgranism to be simulated;
   causing said light source to intermittently produce pulses of light therefrom having rise times, decay times, and a repetition frequency each selected to correspond to the rise times, decay times, and repetition frequency of the bioluminescence of the specific marine organism to be simulated; and placing said light source underwater in a location for attracting said saltwater aquatic creatures.

2. The method according to claim 1 further including the steps of placing said light source in a waterproof housing containing a power supply operating to intermittently energize said light source; and attaching said housing to fishing apparatus.

3. The method according to claim 2 further including the step of providing a water actuated switch for turning on said power supply in said housing when said housing is emerged in water.

* * * * *